(No Model.)
A. PULBROOK.
PNEUMATIC WHEEL TIRE.
No. 534,759. Patented Feb. 26, 1895.
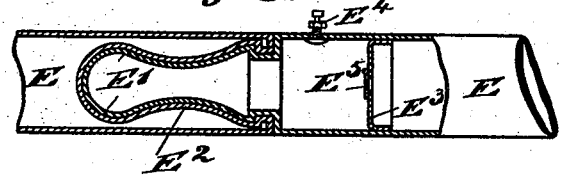
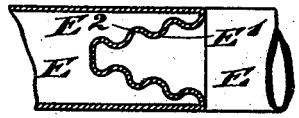
Witnesses.
William Henry Beck
Stephen Edward Gunyon
Inventor.
Anthony Pulbrook

UNITED STATES PATENT OFFICE.

ANTHONY PULBROOK, OF LONDON, ENGLAND.

PNEUMATIC WHEEL-TIRE.

SPECIFICATION forming part of Letters Patent No. 534,759, dated February 26, 1895.

Application filed June 19, 1894. Serial No. 515,082. (No model.) Patented in Belgium April 6, 1894, No. 109,338.

*To all whom it may concern:*

Be it known that I, ANTHONY PULBROOK, solicitor, a subject of the Queen of Great Britain, residing at 14 Victoria House, South Lambeth Road, London, in the county of Surrey, England, have invented certain Improvements in Pneumatic or Inflatable Wheel-Tires, (for which I have obtained a patent in Belgium, No. 109,338, bearing date April 6, 1894,) of which the following is a specification.

This invention relates to an improved method of closing and connecting together or interlocking the ends of the tubes constituting pneumatic or inflatable wheel-tires used in the wheels of cycles and other carriages.

Figure 1 of the drawings represents, in side elevation, the two ends of such a tube prepared for being connected together in accordance with my invention. Fig. 2 is a longitudinal sectional elevation of the same two ends after the tube has been bent round into hoop-form and the said ends have been connected together or interlocked, and Fig. 3 is a sectional view of a modification.

The two ends of the india rubber or other flexible wheel-tire tube E are closed air tight, and are so shaped that one can be inserted in the other. For example the left hand end $E'$ may be made of the shape shown in Fig. 1, the other end $E^2$ being made of similar shape but preferably somewhat larger and turned outside inward, so as to project into the tube as shown in dotted lines in that figure. The end $E'$ is then brought round, in bending the tube E into the hoop form, and is pushed into the part $E^2$ as shown in Fig. 2. The compressed air forced into the tube E, in the usual way, expands the end $E'$ in the end $E^2$, and compresses the end $E^2$ onto the end $E'$, and the shape of the parts then prevents them from being drawn out of one another so long as the air pressure is maintained. As however the internal surface of the part $E'$ is necessarily less than the outer surface of the part $E^2$ the compressed air in E will exert a greater compressive force on $E^2$ than it does an expanding force on $E'$, and there will be a tendency to flatten the connection which may in some cases be objectionable. To obviate this I sometimes place a diaphragm $E^3$ in the tire tube near the smaller end $E'$, and provide the space between it and the said end with a separate inflating valve $E^4$ and force in through such valve, air, preferably at a higher pressure than that in the rest of the tube E, so as to balance any excess of pressure there may be acting on the surface of $E^2$. The diaphragm $E^3$ may be provided with a valve $E^5$ opening toward the part $E'$, which valve will allow air to find its way from the other side of the diaphragm to that part but will prevent the passage of air from the part $E'$ into the other part of the tube E. With a diaphragm and valve of this character I do not always use a second charging valve.

Fig. 3 shows another form of the ends $E'$ $E^2$ in which the said ends are formed with several circumferential corrugations that interlock into one another. It is obvious that the ends $E'$ $E^2$ may be formed in various ways without departing from the nature of my invention.

I claim—

1. A pneumatic tire having air tight ends, one end having the projection and the other the socket to receive the same, said projection and socket having a circumferential groove or corrugation, substantially as described.

2. A pneumatic tire having air tight ends with a projection on one end adapted to fit into a socket on the other end, said projection and socket having circumferential locking portions engaging each other.

3. A pneumatic tire having air tight ends with a projection on one end fitting into a socket on the other, the diaphragm $E^3$ forming a chamber adjacent to the interlocking parts and the valve $E^4$ leading into the chamber.

4. In combination in a pneumatic tire having air tight interlocking ends, the diaphragm $E^3$ forming a supplemental chamber adjacent to the interlocking ends and the valve in said diaphragm, substantially as described.

5. In combination with a pneumatic or inflatable wheel-tire tube with closed ends inserted into and secured in one another as described, a separate air chamber at that end of the tire tube which is inserted into the other end, substantially as described and for the purpose specified.

In witness hereof I have hereunto set my hand in the presence of two witnesses.

ANTHONY PULBROOK.

Witnesses:
WILLIAM HENRY BECK,
STEPHEN EDWARD GUNYON.